(12) United States Patent
Pidhirny et al.

(10) Patent No.: US 6,473,519 B1
(45) Date of Patent: *Oct. 29, 2002

(54) CHECK READER

(75) Inventors: John M. Pidhirny, Skaneateles Falls, NY (US); Kevin R. Jost, Syracuse, NY (US); Thomas D. Britton, Syracuse, NY (US); John L. Casey, Liverpool, NY (US)

(73) Assignee: Hand Held Products, Inc., Skaneateles Falls, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/604,388

(22) Filed: Feb. 21, 1996

(51) Int. Cl.⁷ .................................................. G06K 9/00
(52) U.S. Cl. ........................................ 382/140; 235/379
(58) Field of Search ................................ 194/205, 210, 194/342, 343, 350, 351; 235/375, 379, 432, 474–477, 480, 481, 440, 439, 449, 454, 462, 487; 382/100, 115, 123, 135, 137–140; 395/201, 235, 239, 245; 360/40, 113

(56) References Cited

U.S. PATENT DOCUMENTS

| | | | | |
|---|---|---|---|---|
| 3,949,363 A | * | 4/1976 | Holm | 382/140 |
| 4,196,846 A | * | 4/1980 | Kao et al. | 235/475 |
| 4,276,470 A | * | 6/1981 | Rady et al. | 235/463 |
| 4,433,436 A | * | 2/1984 | Carnes | 382/123 |
| RE31,692 E | * | 10/1984 | Tyburski et al. | 382/140 |
| 4,523,330 A | * | 6/1985 | Cain | 382/140 |
| 4,888,812 A | * | 12/1989 | Dinan | 382/140 |
| 5,126,547 A | | 6/1992 | Norman, Jr. | 235/487 |
| 5,134,663 A | | 7/1992 | Kozlowski | 382/135 |
| 5,198,975 A | | 3/1993 | Baker et al. | 364/406 |
| 5,208,869 A | | 5/1993 | Holt | 382/135 |
| 5,237,620 A | | 8/1993 | Deaton et al. | 382/135 |
| 5,254,196 A | | 10/1993 | Abowitz et al. | 156/235 |
| 5,255,129 A | | 10/1993 | Jones | 360/40 |
| 5,262,624 A | | 11/1993 | Koch | 235/456 |
| 5,266,786 A | | 11/1993 | Mazumder | 235/441 |
| 5,270,523 A | | 12/1993 | Chang et al. | 235/449 |
| 5,396,559 A | * | 3/1995 | McGrew | 380/54 |
| 5,517,587 A | * | 5/1996 | Baker et al. | 382/278 |
| 5,602,936 A | * | 2/1997 | Green et al. | 382/140 |

OTHER PUBLICATIONS

Marriott, Mark, PDF417 Portable Data Files a New Dimension in Barcodes, Sensor Review, v 15,N. 1, p. 33–35, 1995.*

* cited by examiner

Primary Examiner—Jayanti K. Patel
(74) Attorney, Agent, or Firm—Wall Marjama & Bilinski LLP

(57) ABSTRACT

The present invention is an improved check reader which, in addition to having magnetic ink character recognition capabilities, includes image sensing capabilities. A compact housing is provided which receives a document. Mounted on the housing are an imaging assembly, and a magnetic ink character reader, which form an indicia-determining unit, and a transport mechanism for transporting the indicia-determining unit and a received document relative to one another. The check reader further includes a data format engine in communication with the indicia-determining unit. When a document and the indicia-determining unit are transported relative to one another, the data-format engine captures a first electronic representation of indicia formed on the received document, and a second electronic representation of magnetic ink indicia on the received document.

8 Claims, 12 Drawing Sheets

CHECK READER

BACKGROUND OF THE INVENTION

1. Field of the Invention

The present invention relates generally to check readers and more particularly a check reader having image sensing capabilities in addition to magnetic ink character recognition capabilities.

2. Description of Background

When a patron presents a check to a clerk at a bank or store, the clerk typically enters the account number of the patron and the check number of the check by hand into the computer system of the bank or store. Aside from being tedious and time consuming, this process inevitably leads to entry errors.

Recently, compact and portable table top devices, known as "check readers" have become available which are useful in reading checks. This type of device includes a housing having a slot for receiving a check, and a transport mechanism which transports checks through the slot at a known speed. Check readers read information from a check by a process of magnetic ink character recognition (MICR). Standard MICR character font characters printed on the check are read by a magnetic read head mounted in the housing which is biased to remain in constant contact with a check passing through the slot. A permanent magnet mounted in the housing magnetizes the MICR characters before the characters are read by the read head. An example of a check reader of this type is the series ST8300 check reader manufactured by Welch Allyn, Inc. of Skaneateles, N.Y.

Currently available check readers have greatly improved the processing of checks at the initial status of check processing. Where they have been implemented, check readers have improved the speed and ease with which the account number present on a check in magnetic ink is input into a data collection system and have essentially eliminated the problem of entry error.

However, significant problems with the processing of checks at local banks and retail stores remain. For example, current check reading devices do not address the problem of presentment fraud, wherein the endorser or presenter of a check fraudulently holds herself out as the payee of the check.

There exists a need for a low cost, compact device which in addition to providing efficient reading of the account and check numbers imprinted on the check, is equipped to resolve additional problems commonly encountered in the initial stages of check processing, including the problem of presentment fraud.

SUMMARY OF THE INVENTION

According to its major aspects and broadly stated, the present invention is an improved check reader having image sensing capabilities in addition to magnetic ink character recognition capabilities. While the present invention is especially useful for determining indicia elements of a check, which by convention normally have both MICR and non-MICR characters, it will be well understood that the present invention is useful for determining MICR or non-MICR indicia elements formed on any document comprised of paper or other indicia-carrying substrate.

The check reader of the invention is preferably housed in a compact housing, and is adapted for use on a table top. The housing includes a slot for receiving a check, and a transport mechanism for transporting a check relative to the check reader's indicia-determining components. When a check is passed through the slot, magnetic ink characters printed on the check are read by a magnetic read head which is mounted on the housing to remain in contact with the check. The housing further includes a permanent magnet which magnetizes magnetic ink characters of the check so that the characters can be read by the read head.

Magnetic image character recognition (MICR reading) requires that characters being read are printed using magnetic ink. Because characters being read by MICR reading cannot be successfully altered using conventional ink, reading of a check using a MICR reader provides an important security advantage.

In addition to having a MICR read head, a check reader according to the present invention has mounted in its housing an imaging assembly. The imaging assembly can be adapted to sense any indicia printed on the check including and in addition to the MICR characters encoding an account number, check number, bank routing number, amount field, and other MICR information. The check reader of the present invention, therefore, can perform both MICR reading and imaging assembly imaging. MICR "Reading" shall herein refer to the process of determining character type of a magnetic ink character with use of a magnetic read head. "Imaging" shall herein refer to the process of capturing indicia elements present on a document in an electronic format with use of an imaging assembly.

The imaging assembly of the housing includes an image sensor, a source of illumination, and optics for directing light to the image sensor.

The image sensor may be a visible light or infrared (IR) type image sensor in a single element, linear, or matrix array available in various technologies. The imaging assembly may also be an illumination array comprising a rastering laser or laser array detected either by a single or multiple array of detectors.

In one embodiment of the invention, an imaging assembly having a single element type scan image sensor is mounted on the housing proximate the slot, and images one dimensional symbols printed on the check. Such one dimensional images can include bar code symbols. In this type of embodiment, a bar code symbol is printed on the check and can be made to represent specific information about the check or about the patron. When the imaging assembly is a one dimensional manual scan type imaging assembly, the bar code symbol is printed in a predetermined orientation on the check so that the entire length of the bar code symbol passes across the single element scan imaging assembly when the check is transported through the slot.

In another embodiment of the invention, an imaging assembly having a multiple element scan type one dimensional image sensor is mounted on or in the check reader housing proximate the check receiving slot. When a multiple element imaging assembly is implemented in a check reader, a central processor which coordinates the speed and position of the check, and which controls the scanning of the imaging assembly, can be adapted to control scanning of the imaging assembly so that the imaging assembly can acquire and store processable representations of two dimensional images using only a one dimensional sensor.

The central processor coordinating imaging and MICR reading of a check can be disposed in or on the housing that houses the MICR reader and the imaging assembly, or may be positioned at a location remote from the housing.

An imaging assembly of the housing can be adapted to image a portion of or an entire document passing through the check reader. Supplementary image sensors can be provided for imaging indicia elements of a document in addition to those indicia imaged by a first imaging assembly. In one embodiment of the invention, image sensors of the housing are disposed opposite one another to image check indicia on either side of the check during a single transport of the check through the housing.

The transport mechanism of the invention transports a check received in the housing relative to the check reader's indicia-determining components, i.e. the reader's MICR reader and imaging assembly. The indicia determining components may be transported across a stationary received check, or a check may be transported across stationary indicia-determined components. Alternatively, both a check, and a reader's indicia-determining components may be moved in opposite directions toward one another to provide relative movement of a check and a check reader's indicia determining components.

The transport mechanism of the housing normally transports a check at one predetermined constant speed or at two discrete predetermined constant speeds depending upon application and the type of imaging assembly which is installed in the housing. MICR readers transport a check at a constant transport speed. This constant transport speed ranges from about 9 in./sec to about 50 in./sec and varies depending on the type of MICR reader. If the imaging assembly can generate satisfactory resolution at a transport speed sufficient for MICR reading, then the transport mechanism can transport a check at a single speed. If, however, the imaging assembly cannot generate a satisfactory resolution at the MICR reader speed, then the transport mechanism must transport the check at two speeds: A first speed for performing MICR reading and a second speed for performing imaging assembly imaging.

A two speed transport mechanism can be provided by a coordinated system of rollers. A first roller receives a check, transports the document at a first speed and passes the check to a second roller which receives the check and transports it at a second speed. If the check reader is made to accommodate variously-sized checks, then a third middle roller passes the check to the second roller.

The second roller may transport the check in the same direction as the first roller, or in a direction opposite that of the first roller. Orientation of the rollers and the path of the check are not critical. The rollers may be made to transport a check, for example, in a generally horizontal direction, a generally vertical direction, or along a U-shaped path. The transport mechanism, in addition, can be made to transport a check through a housing in a second backward direction after it is transported, partially or all the way through a housing in a first, forward direction. In this embodiment, the MICR reader and the imaging assembly can be employed to redundantly read and image a check as it is passed though the housing in a backward direction.

In addition to or as an alternative to passing a document by a system of rollers, the transport mechanism can transport a document with use of an air transport system wherein the document is supported by air as it moves across the read head and the imaging assembly. A document can also be transported by the force of gravity. For example, in one possible design, a document is imaged and read as it falls downward through a vertically oriented feed path.

Under certain circumstances, an indicia element printed on a check can be imaged while a check is transported manually. In particular, if the imaging assembly images a symbol which is decoded, then synchronous transport of the document is not required, and indicia may be imaged during manual transport. An indicia element on a document can be imaged during manual transport by installing an imaging assembly in the path of a document forward of a document receiver roller. With this configuration, indicia printed toward an edge of a document will be imaged while it is manually transported across an imaging assembly before it is received in a roller.

When a document is manually loaded into a check reader, the document travels asynchronously at low transport speeds of less than about 1 in./sec. A benefit of this low transport speed is that a high resolution computer processable image can be captured using a low scan rate, low cost imaging assembly and at a lower data rate.

The present invention may be utilized in a variety of applications. Hardware and software adaptions of the present invention may vary depending upon application.

In one major application of the present invention, the check reader performs full check imaging for archiving purposes. A full check image can be downloaded to a record-keeping facility, thereby alleviating the need for further check imaging procedures. When an imaging assembly of the check reader performs full check imaging, the optics associated with the imaging assembly and the imaging assembly must be coordinated so that the imaging assembly images a complete width of a check. Further, the transport mechanism is adapted to assure that the entire document is transported at a constant speed across the imaging assembly.

In another application of a check reader according to the invention, the check reader is used in combination with specialized check indicia in an improved check reading system. In the improved check reading system, a two dimensional or a stacked one dimensional portable data file bar code symbol such as PDF 417(PDF) is printed on a check. The symbol is of a type that represents the image of the person authorized to present the check. When the check reader imaging assembly senses a PDF symbol, software associated with the symbol is activated to process the symbol and generate, for identification verification purposes, a near-photograph quality image of the person authorized to present the check. Display of this near photograph quality image may be made by a display component formed in the check reader housing, or by a display component of a remote system. In this application, the optics and the imaging assembly need only image the specific area of a check having the symbol, and the check may be transported manually during image sensing.

In another application of the invention, an imaging assembly is positioned in the check reader housing to image the hand-written dollar amount written in the dollar amount box of the check. With appropriate character recognition software for processing the hand written numeral image, the imaging assembly can be made to automatically read the dollar amount of the check, thereby eliminating the initial check processing step of manually entering the dollar amount of a check into the computer system of a bank or store.

In a related application, an imaging assembly is provided which images the hand-written text image from the dollar amount line of the check. The imaging assembly imaging the dollar amount line of a check may be, for example, a full width imaging assembly having optics for imaging the full width of a check, a large imaging assembly which images both the dollar amount line and the dollar amount box, or a dedicated imaging assembly which images the dollar amount line only. Imaging of the dollar amount line can be used in place of or as a supplement to imaging the dollar amount box of a check so that the check processing step of entering the dollar amount of a check by hand will be eliminated.

In yet another application, an imaging assembly mounted in a check reader is utilized to image the signature line of a check. Where an imaging assembly is positioned to image the signature field, the scanned image is preferably processed by signature processing software of the type which produces a numerical code that varies depending on highlight features of the signature. The numerical code generated by scanning and processing the signature image is then compared to a numerical signature code for the patron which has been printed on the check or which has been entered into the computer system of the bank or store.

A major feature of the present invention is the combination, in a compact housing, of a MICR reader and an imaging assembly. The combination of these two components provides benefits which would not be realized with either component operating independently. The MICR reader determines the identity of difficult-to-counterfeit MICR characters, while the imaging assembly can be adapted to generate a computer-processable representation of any document indicia element. Data generated by the MICR reader and the imaging assembly are processed in combination for improved check reader performance in various possible check verification applications, as discussed herein.

Another important feature of one embodiment of the invention is the transport mechanism having two transport speeds: A MICR transport speed for performing MICR reading, and an imaging transport speed for performing imaging assembly imaging. The two speed transport mechanism allows the present invention to be made using a low scan rate, low cost imaging assembly.

Still another important feature of a certain embodiment of the invention is the adaption of the imaging assembly of the housing to capture an image while the check is transported manually relative to the housing. The manual imaging embodiment allows use of a low cost imaging assembly in a check reader having a two speed transport mechanism, wherein one of the speeds is provided by manual transport.

These and other features of the invention will become clear to those skilled in the art from a careful reading of the Detailed Description of the Preferred Embodiments in connection with the referenced drawings.

BRIEF DESCRIPTION OF THE DRAWINGS

In the Drawings, wherein like numerals indicate same elements throughout the views.

DETAILED DESCRIPTION OF THE PREFERRED EMBODIMENTS

Figure 1:
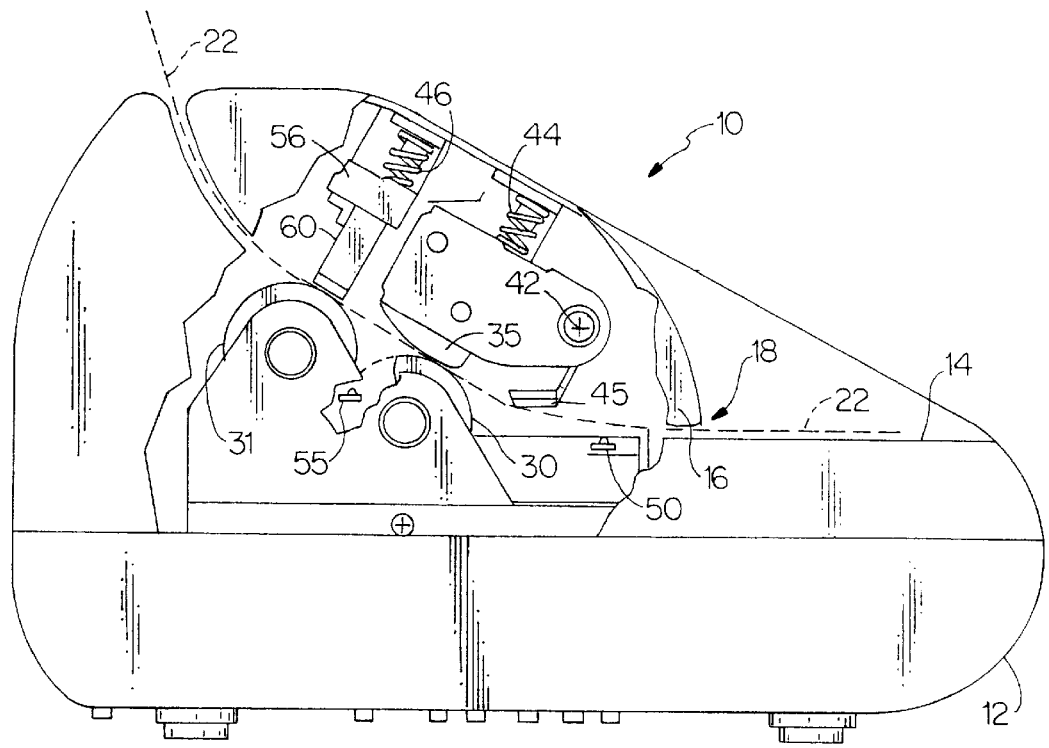
FIG. 1 is a partially cutaway side view of a check reader according to the invention, illustrating the check reader's internal components.

FIG. 1 shows one embodiment of a check reader according to the invention. Check reader 10 includes a housing 12 having a loading platform 14 which, together with a detachable cover 16, defines an inlet slot 18 through which a document may be fed into the reader. Housing 12 also defines a check outlet slot 20 though which a check may exit the housing after being read and imaged. The feed path followed by a check that is moving through reader 10 is indicated by the dotted line labeled 22 in FIG. 1. It will be understood that certain conventional structures that serve to guide the check smoothly along path 22 have been omitted for the sake of clarity.

To the end that a check may be driven through housing 12 and read, reader 10 includes a drive roller 30 and a magnetic read head 35 between which a check passes while moving along path 22. Read head 35 is preferably mounted on a bracket 40 that pivots about an axis 42 and is biased by spring 44, thereby maintaining contact between head 35 and roller 30. For satisfactory MICR reading, read head 35 should, but does not have to remain in contact with the document being read. In so far as it aids in the movement of a document relative to read head 35, roller 30 partially defines a transport mechanism of housing 12. The ink magnetization that enables the characters printed on the check to be read by read head 35 is preferably produced by a permanent magnet 45 under which a check passes immediately prior to its being exposed to read head 35. Position detectors, 50 and 55 are used to determine the positioning of a check in reader 10 during transport of a check through reader 10. First position detector 50 indicates that a check has been inserted into reader 10 and second position detector 55 indicates that a check has exited reader 60. Position detectors 50 and 55 may be provided by, for example, by a photo emitter and detector pair.

In addition to having a MICR read head 35 for reading magnetic ink characters printed on a check, the check reader of the present invention includes an imaging assembly 60 for use in generating computer processable representations of indicia printed on a check. Imaging assembly 60 includes an image sensor, a source of illumination, and optics for directing light to the image sensor. The image sensor of imaging assembly 60 may be a visible light or infrared (IR) type image sensor in a single element, linear, or matrix array available in various technologies including CCD, CMOS, NMOS, PMOS, CID and CMD technologies. Imaging assembly 60 may also be an illumination array comprising a rastering laser or laser array detected either by a single or multiple array of detectors.

Imaging assembly 60 is mounted to housing 12 such that imaging assembly 60 is proximate feed path 22. In the embodiment of FIG. 1, imaging assembly 60 is fixedly attached to mounting bracket 56 which is biased by spring 46 so that imaging assembly 60 remains in contact with second roller 31, thereby biasing a document received in reader 10 against roller 31 to allow transport of the document by second roller 31. Imaging assembly 60 need not be in contact with a document for imaging of the document, but a document should be biased against roller 31 for satisfactory transport of the document by roller 31. A document can be biased against roller 31 by a mechanical component other than imaging assembly 60. Preferably, a single motor is made to drive first and second rollers 30 and 31.

Second roller 31 of the embodiment of FIG. 1 transports a document received in roller at a constant speed across imaging assembly 60, and thereby facilitate full text document imaging. A constant, synchronous transport speed is normally required for applications other than decoding applications. It is seen that if second roller 31 is deleted, then a document received in reader 10 will not be transported across imaging assembly 60 at a constant speed. Second roller 31 and spring 46 may be deleted in cases where a constant transport speed is not required. For example roller 31 and spring 46 may be deleted if reader 10 is not required to image the full length of a document or if indicia at the distal end of a document are symbology indicia requiring decoding.

It is seen in the reader shown in FIG. 1 that the transport mechanism of housing 12 transports a check through a reader relative to indicia determining components of the housing (namely MICR reader 35 and imaging assembly 60) by transporting a check across stationary indicia-determining components, which thereby enables MICR reading and imaging assembly imaging of indicia printed on a check. Skilled artisans will recognize, however, that relative movement between a document and an indicia-determining mechanism can be provided by alternative arrangements of mechanical components. For example, a housing can be provided wherein a document is received in a stationary receiving location and wherein a carrier bracket containing a MICR reader and an imaging assembly is transported relative to a stationary document. A MICR reader and an imaging assembly can be moved independently and at different times across a stationary document. A housing can also be provided wherein a check and indicia-determining components are both made moveable to provide relative movement therebetween.

In one embodiment of a check reader according to the invention, imaging assembly 60 includes a single element type scan image sensor, and reads one dimensional symbols printed on the check. Such one dimensional images can include bar code symbols. In this type of embodiment, a bar code symbol is printed on the check and can be made to represent specific information about the check or about the patron. When the imaging assembly includes a single element type image sensor, the bar code symbol is formed in a predetermined orientation on the check so that the entire length of the bar code symbol passes across the single element scan imaging assembly when the check is transported through reader 10. A data format engine, coordinated with the scanning of the imaging assembly, captures a representation of the symbol in an electronic format and decodes the symbol utilizing an available decoding technology.

In another embodiment of the invention, imaging assembly 60 includes a multiple element scan type one dimensional image sensor. When an imaging array including a multiple element image sensor is implemented in a check reader, a data format engine coordinating with the scanning of the imaging assembly is adapted to capture processable representations of two dimensional images using only a one dimensional imaging assembly.

The particular type of imaging assembly implemented in reader 10 determines whether certain additional components need to be included in the invention. In general, if imaging assembly 60 of housing 12 can generate a computer-processable image of satisfactory resolution while a check is moved relative to imaging assembly at a transport speed sufficient for MICR reading, then the transport mechanism of the check reader can be a single speed transport mechanism. If, however, imaging assembly 60 will not generate an image of satisfactory resolution when transported relative to a check at a transport speed sufficient for MICR reading, then reader 10 requires a two speed transport mechanism, or a transport mechanism that accommodates imaging during manual feeding of a check. In a check reader having a two-speed transport mechanism, the check reader performs MICR reading when a check is transported at "MICR" transport speed and performs image sensing when the check is transported at an "imaging" transport speed.

In the direction transverse to the direction of transport, resolution of an image generated by an imaging assembly is determined by the number of pixels in the imaging assembly and the width of the imaged space. The resolution of an image generated by an imaging assembly in the direction of transport, meanwhile, is a function of the scanning rate of the imaging assembly and of the transport speed. Transport-direction imaging assembly resolution, in dots per inch, can be calculated according to:

$$Resolution = \frac{Scan\ Rate}{Transport\ Speed} \qquad \text{Equation 1}$$

where scan rate is given in scans per second, and transport speed is given in inches per second.

Figure 2:
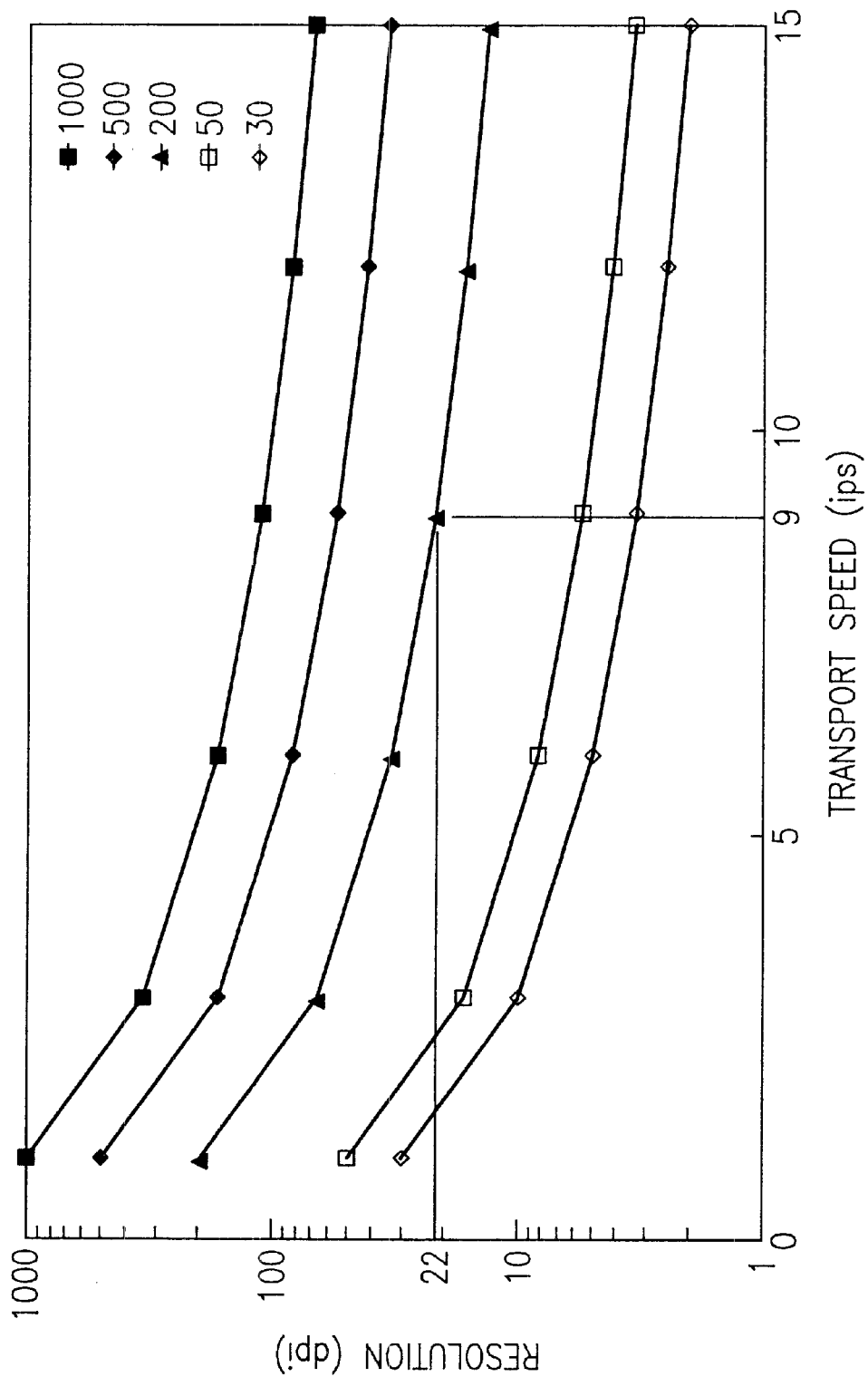
FIG. 2 is a plot of resolution v. transport speed for image sensors having various scanning rates.
Figure 9A:
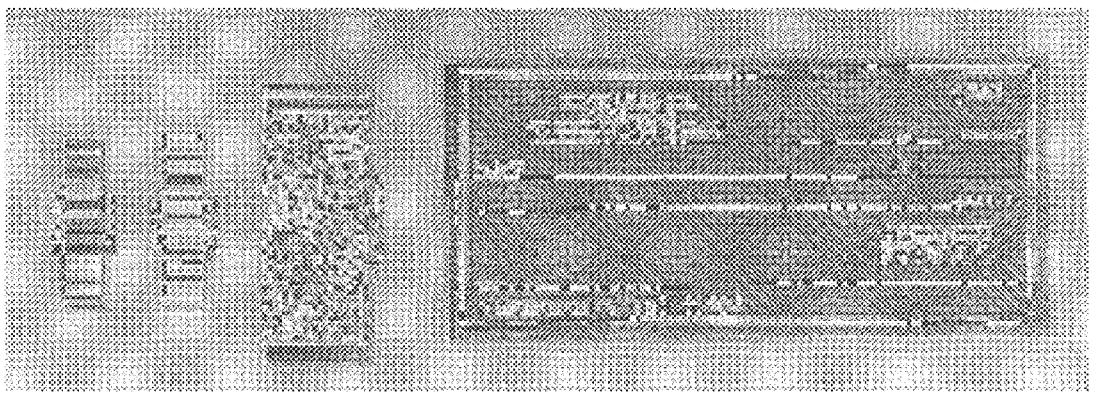
FIG. 9a shows a check and various bar code symbols imaged at a resolution of about 20 dots per inch.
Figure 9B:
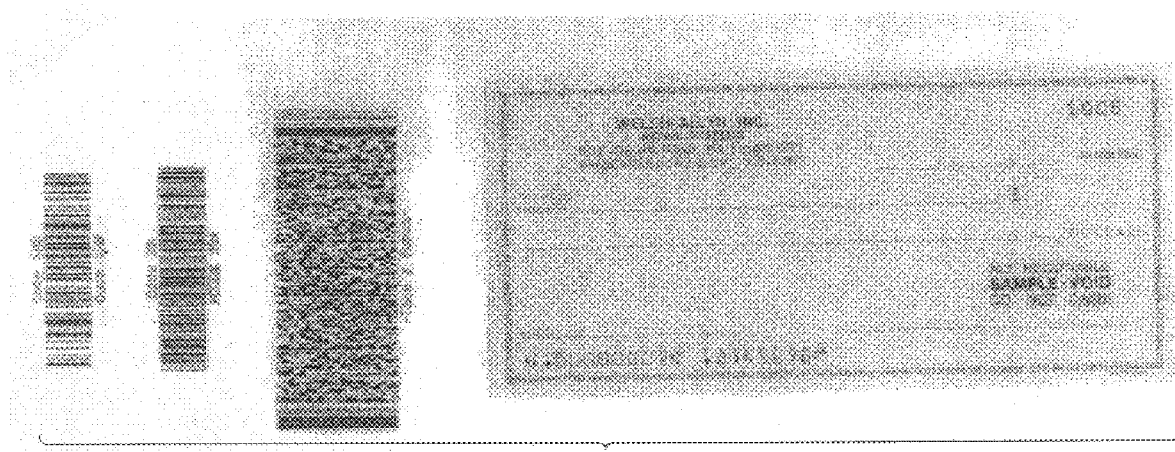
FIG. 9b shows a check an various bar code symbols imaged at a resolution of about 50 dots per inch.
Figure 9C:
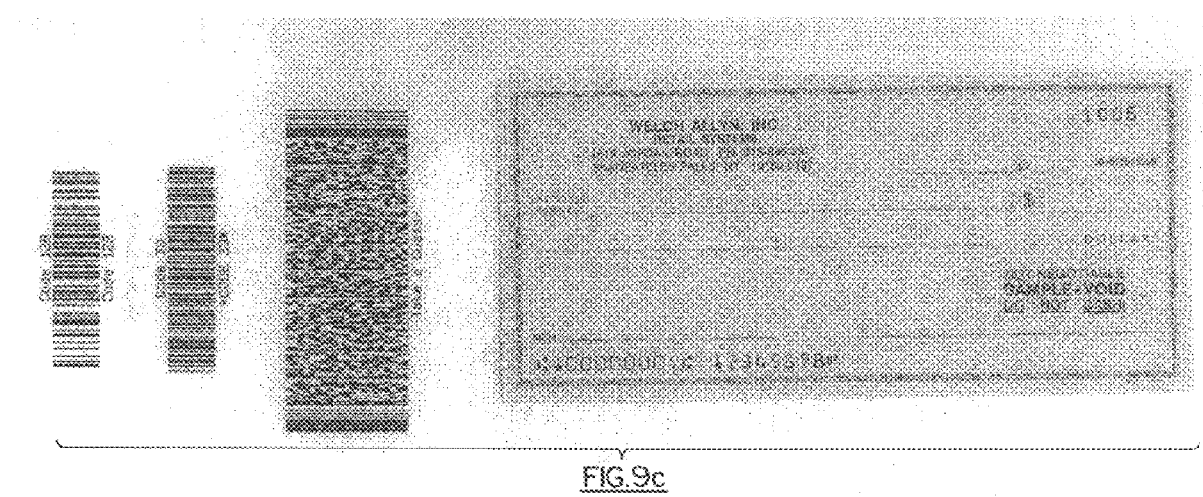
FIG. 9c shows a check and various bar code symbols imaged at a resolution of about 200 dots per inch.

FIG. 2 shows a plot correlating transport-direction resolution with transport speed for image sensors having various scanning rates. The resolution required for satisfactory functioning of the present invention varies widely depending on application. For example, if the check reader will be used to determine simply whether or not a signature is present on check, then a resolution of 20 dots per inch, as illustrated in FIG. 9a, may be sufficient for such application. For human eye recognition, a resolution on the order of 50 dots per inch, as illustrated in FIG. 9b will normally be sufficient. For software-implemented character recognition, the resolution should be at least about 200 dots per inch, as illustrated in FIG. 9c. In most software character recognition applications, indicia elements are imaged to a resolution of at least about 400 dots per inch.

For decoding of imaged bar code symbols of certain bar codes symbologies the resolution requirements are even greater. In order to properly detect edges of a high density bar code symbol, the imaging assembly should be capable of imaging at least to a resolution of about 1.3 mils (equivalent to 745 dots per inch).

A document must be transported at a relatively high transport speed for proper MICR reading of MICR characters printed on the document. The transport speed of a check in a standard check reader having MICR reader capabilities ranges between about 9 inches per second and about 50 inches per second. In the Welch Allyn ST8300 check reader, transport speed is about 10 inches per second. A high transport speed is required for MICR reading because the MICR read head is used to detect the rate of change of magnetic flux and to output a voltage related to this rate of change. Therefore, an increased read rate yields a greater signal to noise ration, desirable for MICR reading. The transport speed required for MICR reading may be lowered by a more effective MICR reading methodology.

Referring to FIG. 2, the imaging assembly scan rate required for adequate resolution of a computer-processable image depends on the transport speed with which a document is transported relative to the imaging assembly. When transported at a typical MICR speed of 10 inches per second, it is seen that imaging assembly 60 of reader 10 must have a scan rate of about 500 scans per second to generate a 50 dot per inch resolution sufficient to allow human eye character recognition, a scan rate of about 2000 scans per second to generate a 200 dot per inch resolution adequate for character recognition, a scan rate of about 4000 scans per second to generate a 400 dot per inch resolution sufficient for standard software character recognition algorithms, and a scan rate of about 8000 scans per second to generate a 1.3 mil resolution sufficient for decoding of many bar code symbologies. FIG. 9a illustrates a the result of imaging a document using 200 scan per second imaging assembly which is transported at a transport rate of about 10 inches per second. It is seen that images generated by the imaging assembly are not recognizable to the naked eye, much less processable by a computer in a software-aided character recognition algorithm. The resolution may be sufficient, however, to determine, for example, whether or not a signature is present on a document.

It is seen from the above that in order to make a single speed check reader which adequately images document indicia elements while a document is transported at a standard MICR transport speed of about 10 inches per second, imaging assembly 60 will normally be selected to have a scan rate of about 500 scans per second or higher depending on application.

Figure 3:
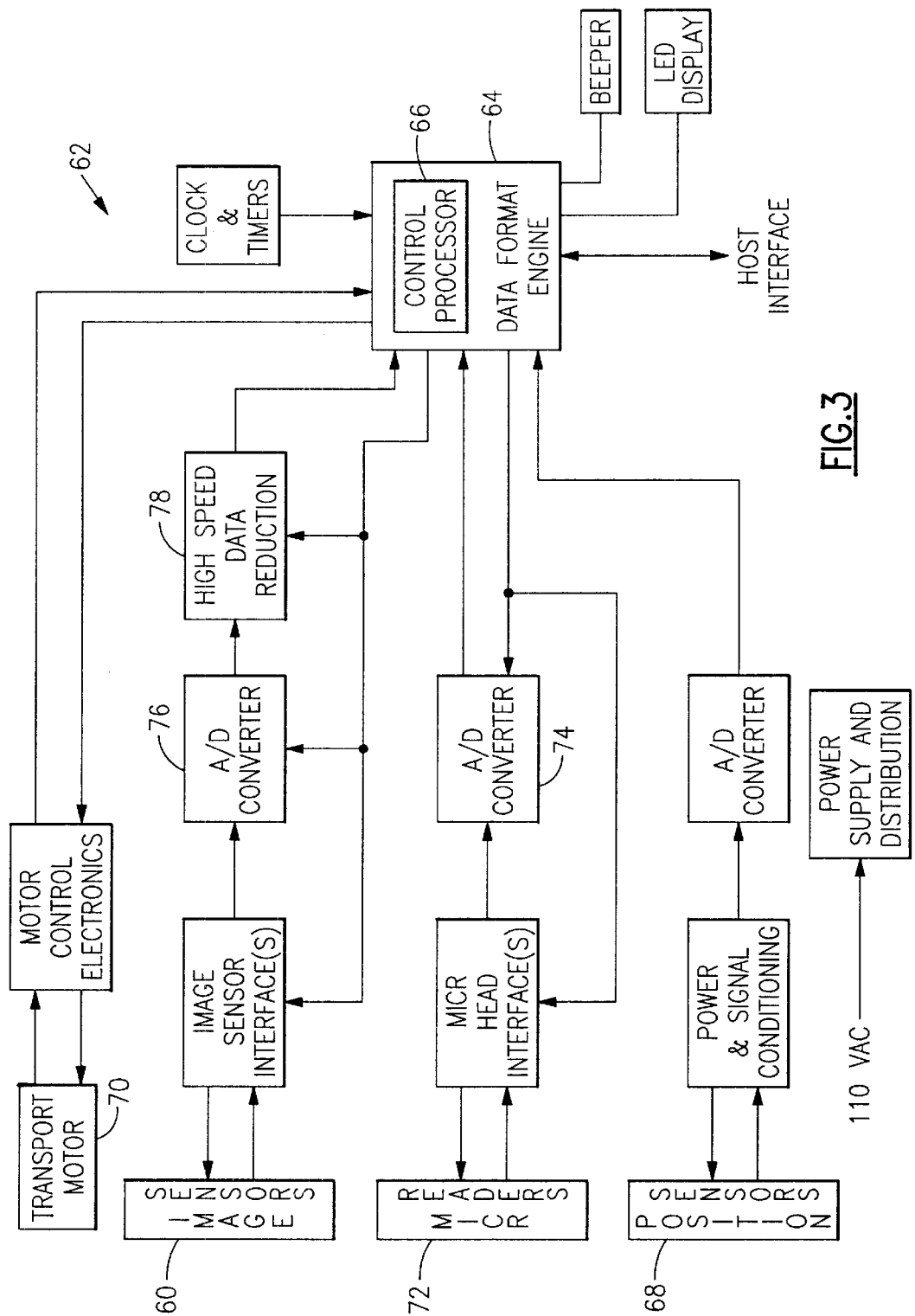
FIG. 3 is a block diagram illustrating electrical connections between hardware elements of a check reader according to the invention.
Figure 4A:
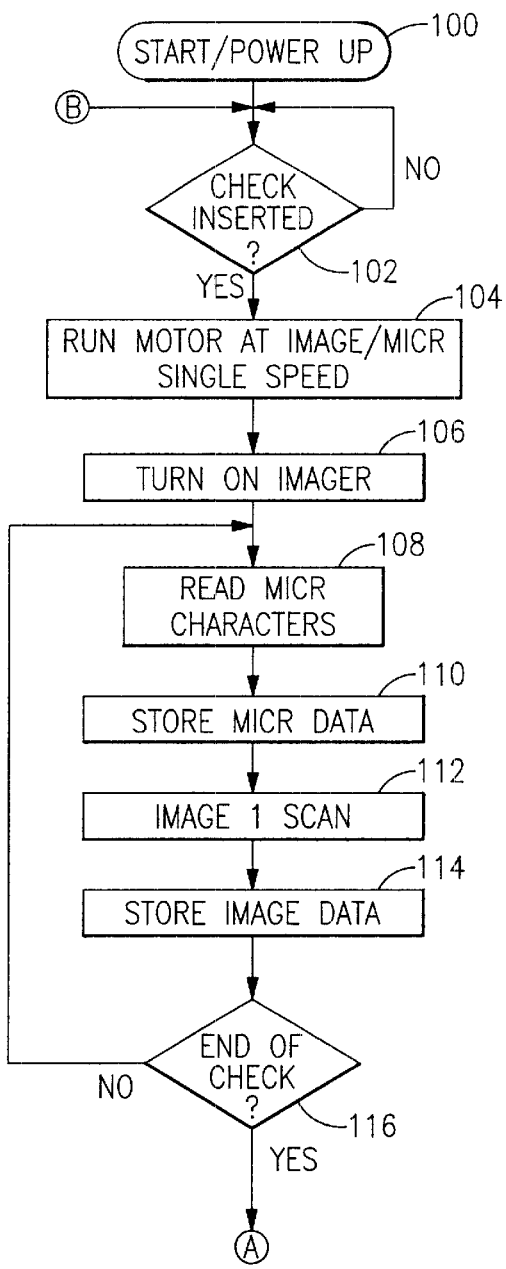
FIGS. 4a and 4b comprise a flow diagram illustrating operation of a check reader having a multiple element high scan rate imaging assembly installed therein.
Figure 4B:
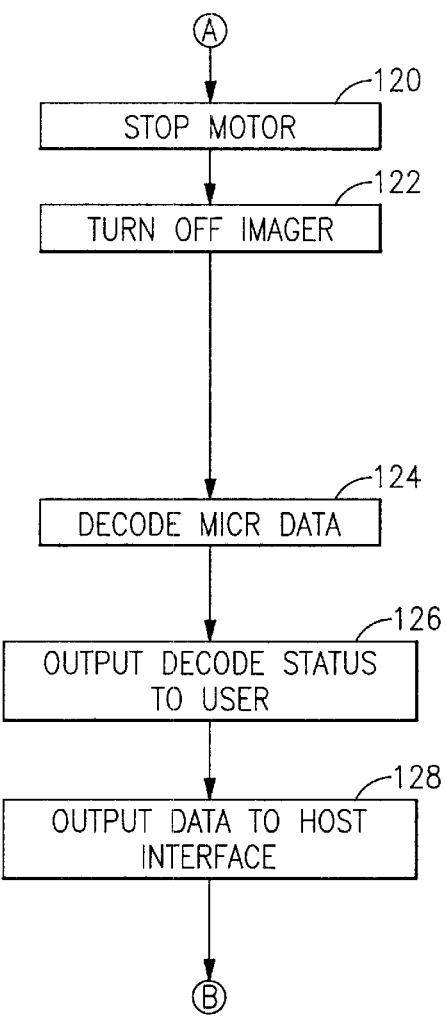

Check reader 10 of FIG. 1 having two closely spaced transport rollers 30 and 31, or which may have only one roller 30 transport a document at a single constant transport speed. Operation of a check reader having a single speed transport mechanism is described in detail with reference to FIG. 3 showing a block diagram of the hardware components of a single speed or multiple speed check reading system, and FIGS. 4a and 4b showing a flow diagram illustrating operation of a check reader having a single speed transport mechanism.

System 62 includes preferably a data format engine 64 which may comprise a central processing unit 66 and memory devices. Such memory devices, as is well known to skilled artisans, may include a random access memory (RAM) device generally for storing data acquired during operating of the system and a read-only memory (ROM) device generally for storing a computer program controlling transfers of data carried out by the central processing unit.

In general, processor 66 continuously reads position sensors 68 (shown as 50 and 55 in FIG. 1) to determine the position of the document in the check reader, and generates control signals which control operation of transport motor 70 depending on the position of the document. Position sensors 68 can also be made to interrupt operation of system 62. Transport motor may be a step motor which rotates in response to control signals in discreet phases. In a moving phase, the motor rotates a predetermined number of degrees. In a rest phase, the motor is motionless. For improved image quality, a document which is transported though check reader of the invention is imaged while the motor is in a rest phase. During operation, the move and rest phases will occur rapidly, and the amount of movement of motor 70 during each move phase will be small such that step motor 70 will have the appearance of moving continuously. Motor control block 73 includes circuitry for controlling transport motor 70, which may be a simple single stage motor or a step motor.

In addition to generating control signals for controlling motor 70, control processor 66 generates control signals instructing MICR reader 72 to begin MICR reading magnetic characters of the document, and for instructing imaging assembly 60 to begin imaging check indicia. MICR reader 72 generates an analog signal having a discernable leading edge when read head 35 of reader passes across or is passed across a magnetized magnetic character. Processor 66 periodically samples the output of MICR analog to digital (A/D) converter 74, preferably at a sample rate of about 80 count pulses per character, and stores a digital representation of the analog signal in a memory device of data format engine 64. After an entire magnetic ink character string is MICR read, this digital representation is processed to identify the characters of the string on the basis of leading edge strength. Imaging assembly 60 generates an analog signal indicating the voltage output of an array of pixels. At a sampling rate that may depend on the imaging assembly scan rate, processor 66 reads and stores in a memory device of data format engine 64 the output of imaging assembly analog to digital converter 76. As indicated by 78, high speed data reduction can be employed to reduce data quantity, rate, and storage requirements of data format engine 64 in consideration of the number of bits of quantiziation. More than one control processor can be employed to MICR read and image document indicia.

Figure 10A:
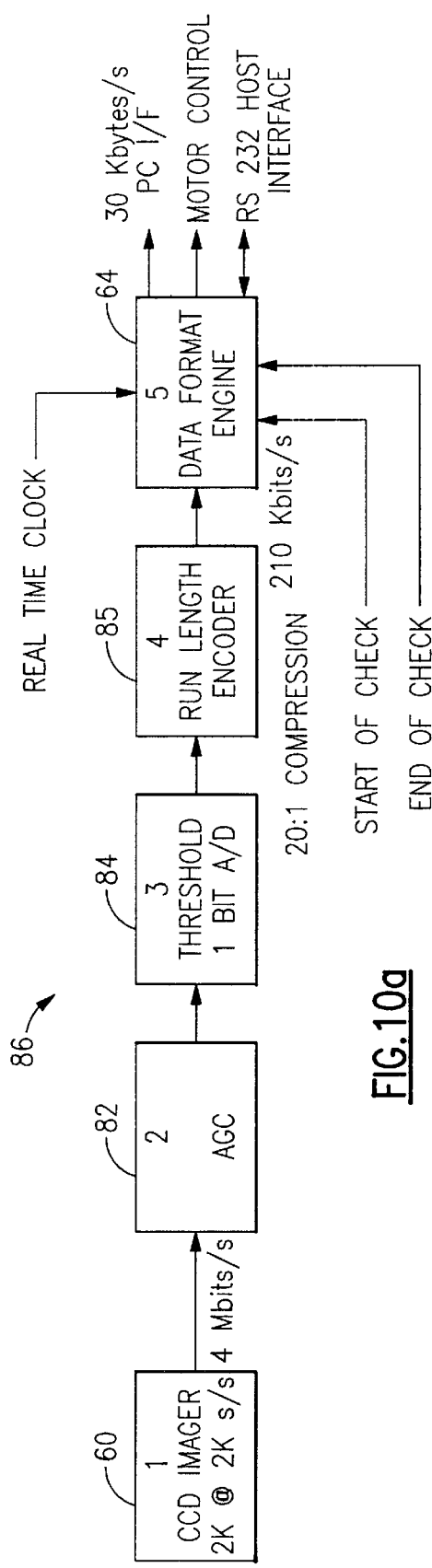
FIG. 10a is a block diagram of single bit quantizer for providing a data acquisition and reduction function.
Figure 10B:
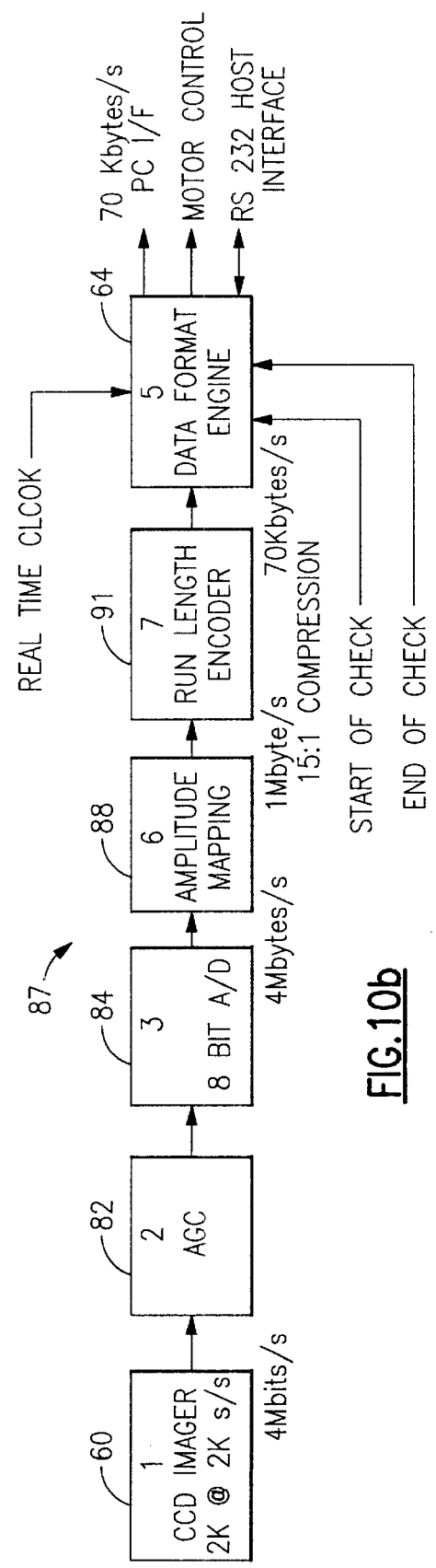
FIG. 10b is a block diagram of an eight bit, A/D 2 bit resolution quantizer for providing a data, acquisition and reduction function.
Figure 10C:
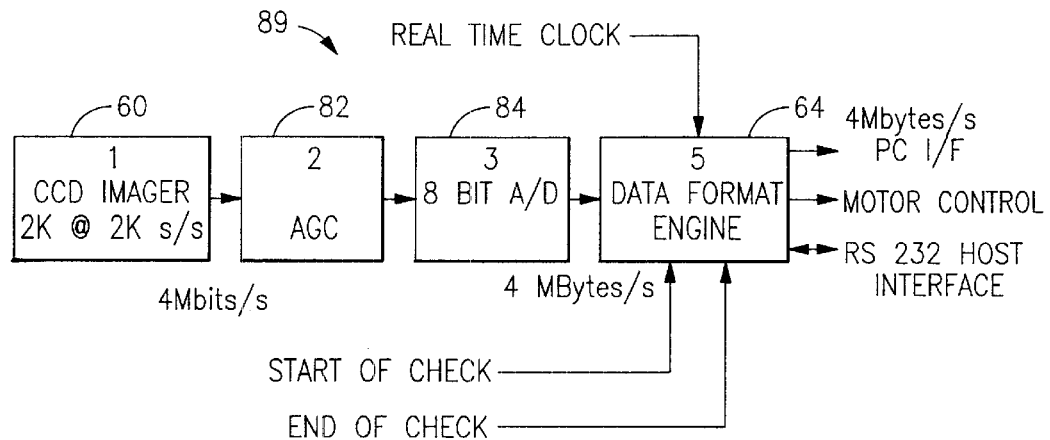
FIG. 10c is a block diagram of a full eight bit quantizer for providing a data acquisition and reduction function.

FIG. 10a depicts a single bit quantizer 86 having an imaging assembly 60, an automatic gain control (AGC) 82, and an analog to digital converter 84. Single bit quantizer 86 employs a Huffman, or other type of run length encode scheme, as indicated at 85 to implement a data reduction function. FIG. 10b illustrates a 2 bit resolution 8 bit quantizer 87 having an amplitude mapping circuit 88 and a Huffman or other type of run length encoder 91 for providing a data reduction function. FIG. 10c, meanwhile, illustrates an 8 bit quantizer 89 which does not include data reduction circuitry. Skilled artisans will recognize the tradeoffs between data rate and storage in the examples shown in FIGS. 10a, 10b, and 10c.

Reference will now be made specifically to flow diagram of FIGS. 4a and 4b, illustrating operation of a check reader according to the invention having a single speed transport mechanism. After the system is powered up at step 100 processor 66 repeatedly reads position detector 55 at step 102 to determine if a document has been inserted into the check reader. When position detector 50 determines that a check has been inserted, transport motor 70 is started up at step 104 and imaging assembly 60 is turned on at step 106.

Transport roller 30 then receives the document, and transports the document through check reader 10.

While the document is transported through the check reader, MICR characters are MICR read, and indicia elements are imaged. At step 108 a voltage indicating a data point on a MICR reader analog waveform is read from MICR analog-to-digital converter 74, and at step 110 the data point is stored in a memory device. At step 112, processor 66 reads the output of converter 76, and at step 116 the digitized waveform indicating the pixel array output of imaging assembly 60 is stored in a memory device. Step 118 determines if the end of a check has been reached, a state condition achieved when neither first position 50 detector nor second position 55 detector detects the presence of a document in reader 10. At step 120 the motor is stopped, and at step 122 the imager is turned off. The check reader operated according to the flow diagram of FIG. 5a and 5b is a continuous single-stage, single-speed motor. Therefore, there is no intervening control of motor 70 during the image capture, and MICR read process.

In step 124 processor 66 processes data points generated by MICR reader 72 to determine the identity of characters in the MICR character string on the basis of the leading edge strength of the digitized analog waveforms generated by magnetic read head 35.

At step 126 stored images generated by imaging assembly 60 are subjected to further processing. Such further processing which is discussed elsewhere in greater detail herein may include, but is not limited to: Archiving of the stored data, wherein the stored images are transmitted to a permanent storage location; software-aided character recognition, for example, in the case where handwritten characters of the check require identification; and symbol decoding, for example, in the case where the identity of a bar code symbology is determined.

In the embodiment just described, imaging and MICR reading are possible in a check reader having a single speed transport mechanism by virtue of the fact that an imaging assembly having a high scan rate image sensor is installed therein which can generate an image of satisfactory resolution when a check is transported relative to a MICR at a high transport speed. However, implementation of a high scanning rate image sensor can be undesirable in view of the high cost of such image sensors. For example, an NEC model UPD35H71AD image sensor having a scanning rate of 5000 scans per second is available for more than ten times the cost of a Toshiba model 1201 image sensor having a scan rate of 200 scans per second.

A reduced cost check reader according to the invention which utilizes an imaging assembly having a lower scan rate is realized by providing a transport mechanism having two transport speeds. An "imaging" transport speed for performing image sensing, and a "MICR" transport speed for performing MICR reading. Referring again to equation 1, a 200 dots per inch resolution image can be generated using an imaging assembly having a scan rate of 100 scans per second and by transporting the check at an imaging transport speed of 0.5 inches per second.

Figure 5:
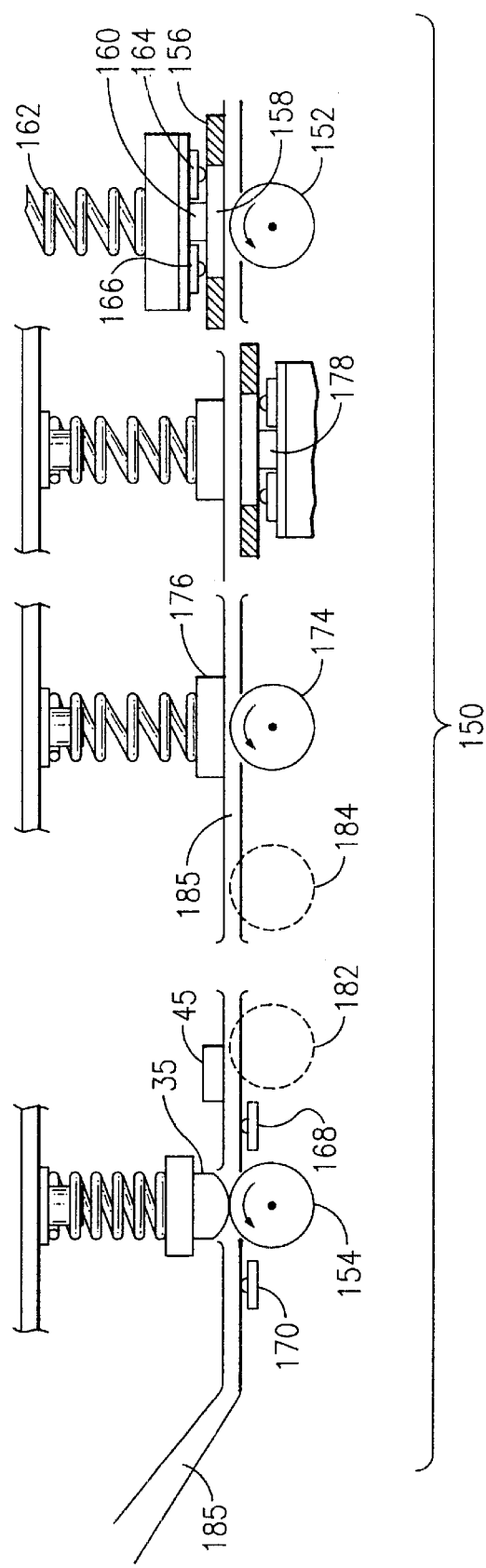
FIG. 5 is a functional diagram of check reader according to the invention having a two speed transport mechanism.

A functional diagram for one possible embodiment of a two speed check reader transport mechanism is shown in FIG. 5. Two speed transport mechanism 150 includes first transport roller 152 and second transport roller 154. First transport roller 152 transports a check across imaging assembly 60 and second transport roller 154 transports a check across MICR read head 35. Imaging assembly 60 is mounted to imaging assembly 156 behind window 158 and assembly 156 is biased preferably by spring 162 to maintain contact between window 162 and first roller 152. MICR read head 35, meanwhile is biased to remain in contact with second roller 154. First and second rollers 152 and 154 may be powered by a single motor, as indicated in block diagram of FIG. 3. Preferably, a gear or belt system (not shown) powered by motor 70 is adapted, by methods well known, to drive rollers 152 and 154 simultaneously. Motor 70 in the case of a two speed transport mechanism is capable of attaining variable speeds so that at a predetermined point during operation of transport mechanism 150, the speed of rollers 152 and 154 can be changed from an imaging transport speed to a MICR transport speed or vice versa. Position detectors, 164, 166, 168 and 170 which may be photodetector based motion detectors, are installed to provide information regarding the position of a check within the check reader. In the embodiment shown, first position detector 164 determines if a check has been presented, and second position detector 166 determines if imaging of the check has been completed. Third position detector 168 determines if check has been transported to MICR read head 35 and fourth position detector 170 determines if MICR reading of the check is complete. The relative positions of image sensor 60 and read head 35 can be revised.

In addition to first and second rollers 152 and 154, transport mechanism 150 may include third roller 174 having associated therewith a bracket 176 biased to maintain contact with third roller 174. Third roller 174 enables transport mechanism 150 to accommodate checks of different sizes. Checks are commonly available in three different sizes; personal check size (2.75"×6"), business check size (3.7"×8.5"), and South African check size (3.5"×7.75"). To the end that transport mechanism 150 accommodates all sizes of checks, image sensor 60 and read head 35 are spaced apart to a distance of about equal to the maximum check length, or greater. A check of shorter-than-maximum length will be fully supported by third roller 174 when transported between first and second rollers 152 and 154. It will be recognized that the two or three roller systems described above can be replaced by a system having multiple, relatively closely spaced rollers as indicated by dashed roller 182 and 184. Further, it will be seen that first roller 152 does not have to be aligned with image sensor 60, and that second roller 152 does not have to be aligned with read head 35 as long as read head 35 is biased to contact a document passing through slot 185. Whether or not rollers 152 and 154 are aligned with image sensor 60 and read head 35, respectively, image sensor 60 and read head 35 should be spaced apart to a distance at least equal to the maximum length of the received document so that the apparatus can be configured for full length document imaging and MICR reading of a document having any length within a range of possible lengths.

Also shown in the transport mechanism of FIG. 5 is supplementary imaging assembly 178 which may be installed in a check reader having a one or two speed imaging assembly. Supplementary imaging assembly 178 is positioned opposite imaging assembly 60, as shown so that the opposite side of a check may be imaged when transported through a check reader. Imaging assemblies 60, 178 should be spaced apart so that an illumination source of one assembly does not affect the operation of the other assembly. A supplementary MICR read head can be implemented in a check reader to enable opposite-side MICR reading of magnetic ink characters printed on the reverse side of a check.

Additionally, or as an alternative to using a plurality of MICR readers and/or imaging assemblies, the document feed path may be formed such that the document is turned over during transport so that a second side of a transport passes across an indicia-determining component after a first side passes across the same indicia-determining component.

In addition to or as an alternative to passing a document by a system of rollers, the transport mechanism can transport a document with use of an air transport system wherein the document is supported by air as it moves across the read head and the imaging assembly. A document can also be transported by the force of gravity. For example, in one possible design, a document is imaged and read as it falls downward through a vertically oriented feed path.

Figure 6A:
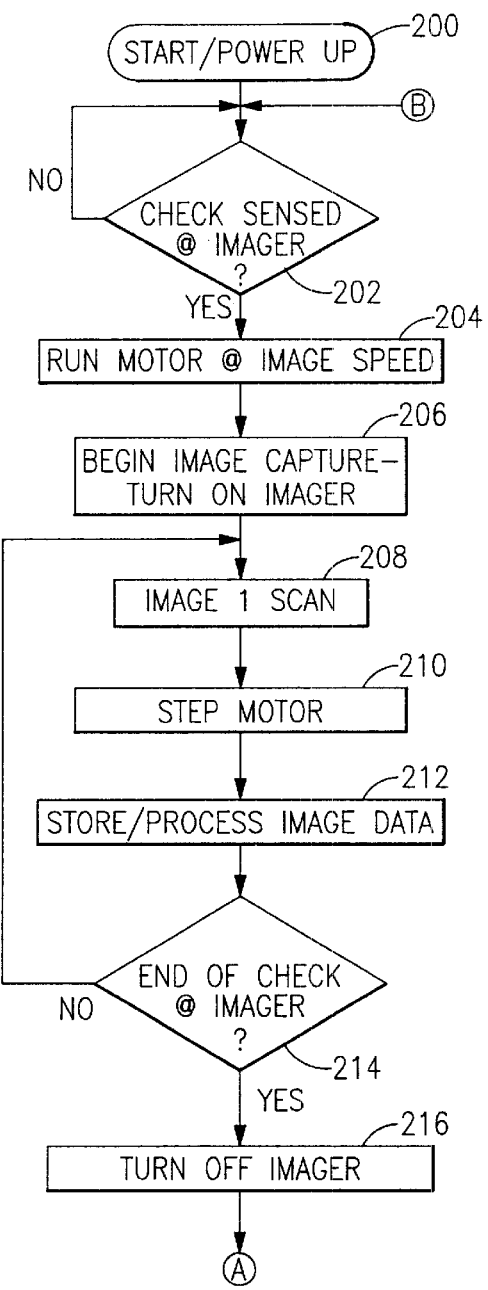
FIGS. 6a and 6b comprise a flow diagram illustrating operation of a check reader according to the invention having a two speed transport mechanism.
Figure 6B:
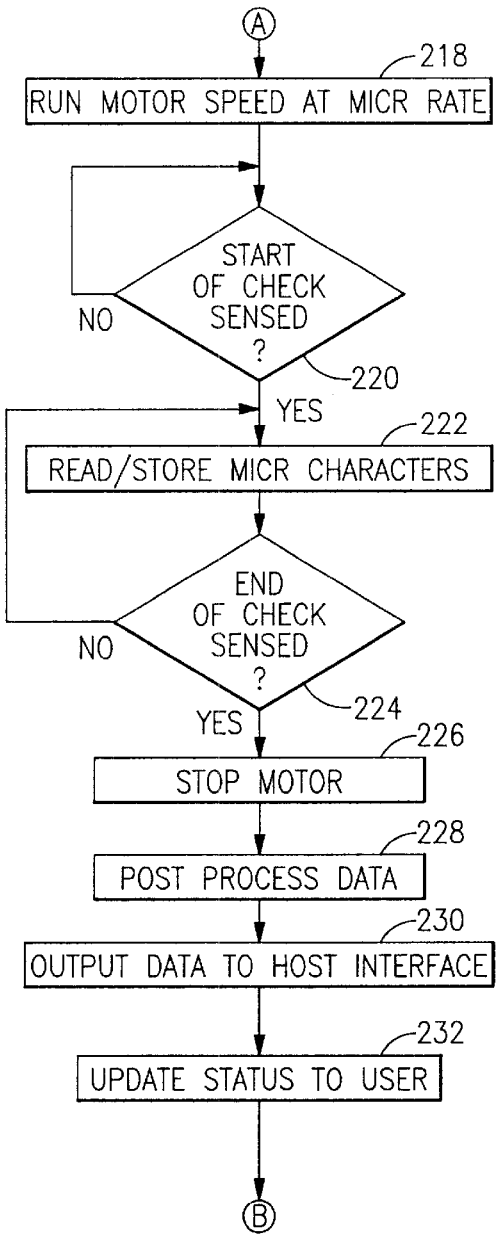

Now referring again to the block diagram of FIG. 3 and to the flow diagram of FIGS. 6a and 6b, operation of a check reader in having a two speed transport mechanism will be described. As the system is powered up at step 200, processor 66 determines at step 202 if a check has been inserted into the reader by reading the output from first position detector 164. Processor 66 in step 204 then generates control signals to run step motor 204 at an imaging transport speed. After imaging assembly 60 is powered up at step 206 image capture begins. In steps 208, 210, and 212 processor 66 repeatedly reads the output from analog-to-digital converter 76 while motor is in a stop phase, instructs motor 70 to move, and stores the converter output into a memory location, until at step 214 a determination is made that the check has passed completely across imaging assembly 60, a condition indicated by second position detector 166 turning low. Imaging assembly 60 is then shut off at step 216 and the motor transport speed is changed to a MICR transport speed at step 218. After the presence of a check at read head 35 is sensed at step 220, processor 66 repeatedly reads the output of MICR reader A/D converter 74 at a predetermined sample rate until at step 224 a reading of the output from fourth position detector 170 indicates that the end of a check has been reached. Motor 70 is stopped at step 226, and certain post-data-capture steps are carried out in steps 228, 230 and 232.

For archiving applications and for software-aided character recognition applications, a constant imaging transport speed is normally required so that image distortion problems are avoided. However, in the case where stored images are symbologies requiring decoding, some image distortions are often tolerable, and a document can normally be imaged satisfactory while being transported asynchronously through a check reader.

A document is transported asynchronously through a check reader when it is transported by hand. One advantage of manually transporting a document through a check reader is that asynchronous transport rate will be moderate (in the range of from about 0.25 inches per second to about 1.0 inches per second). Therefore a computer processable image having satisfactory resolution can be generated using a low cost imaging assembly having a scan rate on the order of 50 scans per second or less.

Figure 7:
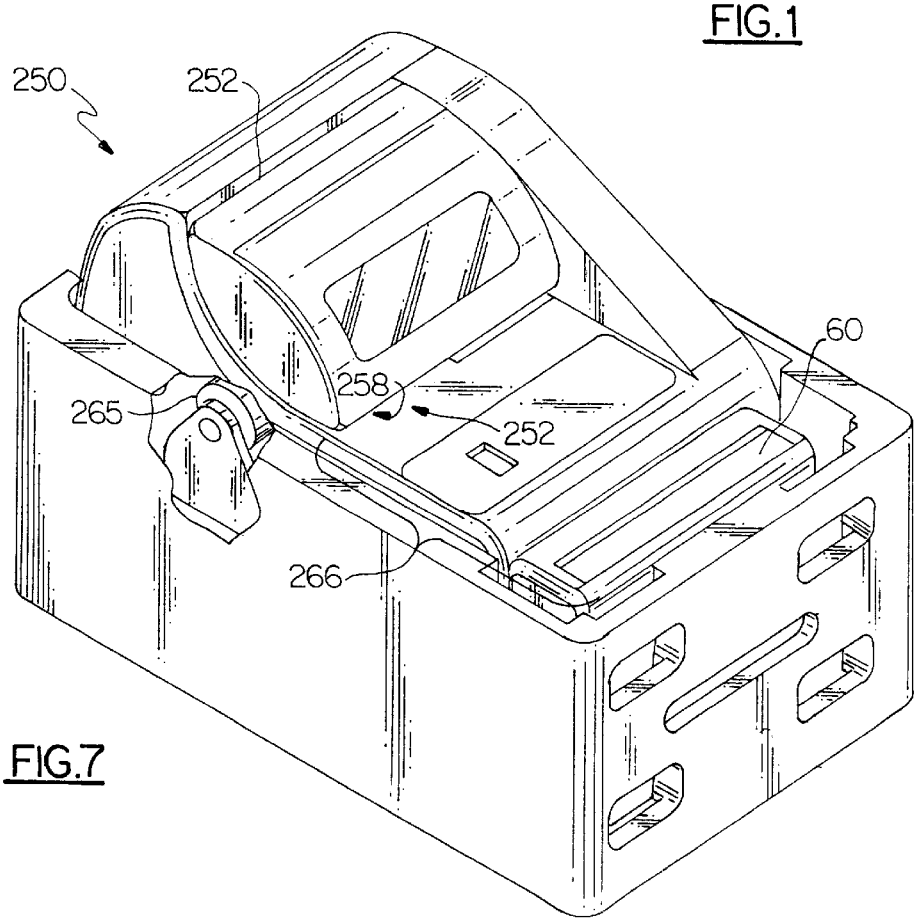
FIG. 7 is a perspective view of a manual imaging check reader according to the invention.

A manual imaging check reader is shown in FIG. 7. Like the embodiment discussed in connection with FIG. 1 manual imaging check reader 250 includes a transport mechanism 265 for transporting a document at a constant speed across a MICR read head. However, to the end that manual imaging check reader 250 can image documents as they are moved manually, manual imaging check reader 250 includes important modifications. Particularly, imaging assembly 60 is mounted forwardly from transport mechanism 265 and directed toward loading platform 266, which partially defines a feed path and extends forwardly from slot 252. Shown in FIG. 7 as being installed below loading platform 266, imaging assembly 60 may also be installed above loading platform 266 to enable imaging of a symbology printed on the face of a document. With imager sensor 60 mounted forward of transport mechanism 265, documents inserted into slot 252 can be imaged while being loaded into reader 252 before contacting transport mechanism 265, shown in FIG. 7 as a roller. It will be recognized that this embodiment of the invention is especially useful in the case where a symbol formed toward a leading edge of a document requires decoding. While a manual imaging check reader can also be provided by installing an imaging assembly rearward of transport mechanism 265, such a configuration is normally not preferred because it does not take advantage of the slow transport speed inherent to the loading step as in the configuration of FIG. 7. It will be recognized that a manual imaging transport mechanism according to above description is a two speed transport mechanism as described herein wherein the asynchronous manual transport of a document constitutes an imaging transport speed.

Figures 8A, 8B:
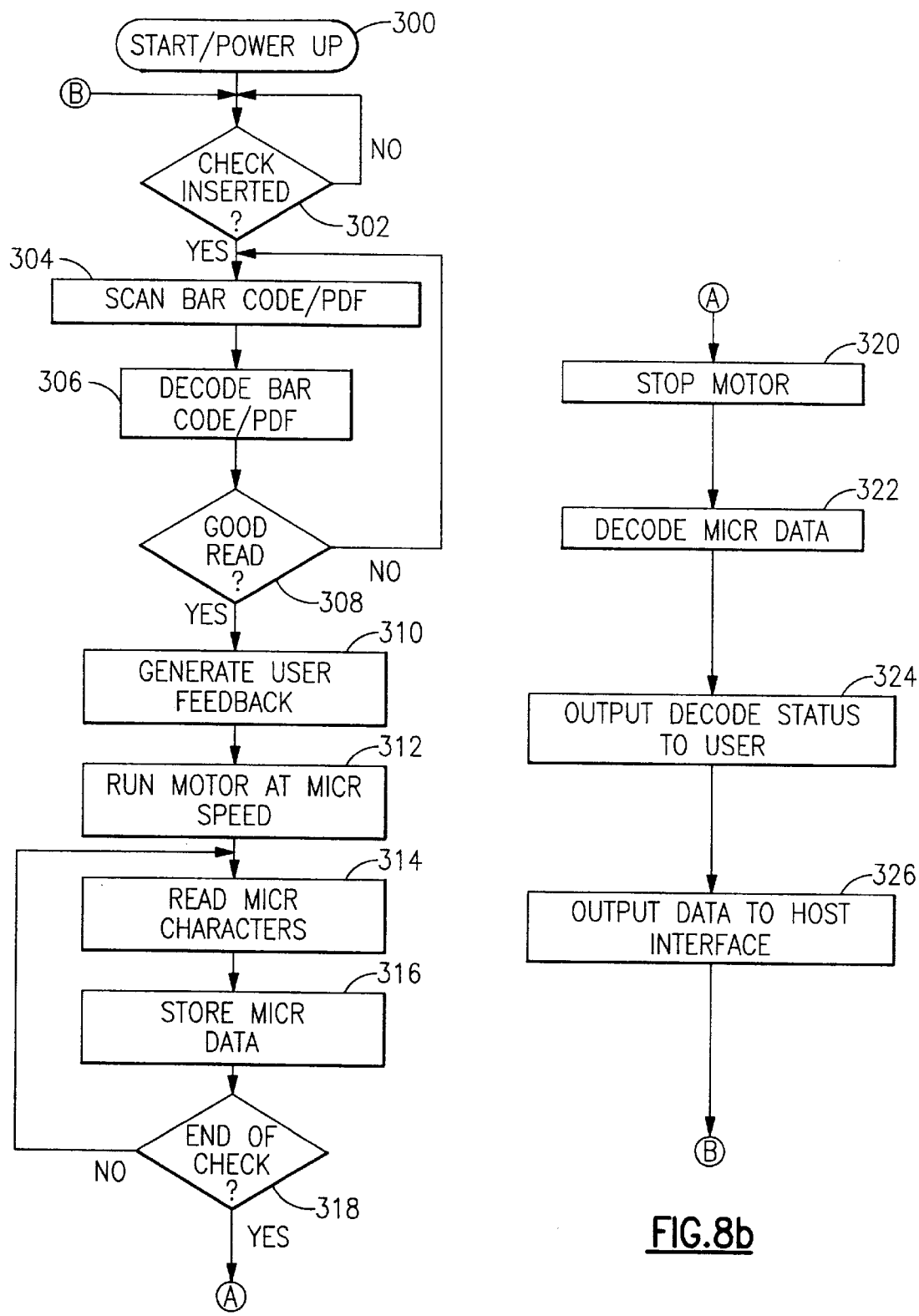
FIGS. 8a and 8b comprise a flow diagram illustrating operation of a manual imaging check reader according to the invention.

Operation of manual imaging check reader is described with reference again to the block diagram of FIG. 3 and to the flow diagram of FIGS. 8a and 8b. After the system is powered up at step 300, processor 66 determines if a document has been inserted by continuously reading the output from a position detector which is mounted proximate slot opening 258. Upon detection of a document, processor 66 at steps 304 and 306 repeatedly reads the output of imaging assembly converter 76 and attempts to decode the captured image. The attempt to decode the image can be carried out depending on the type(s) of symbologies present on the document with use of one or more of several available and widely known decoding algorithms including, for example, algorithm for decoding code 39, UPC, I2 of 5, code 128, code 49, code one, PDF417, or Maxicode. The effectiveness of the decoding algorithm can be enhanced with the implementation of an additional algorithm which corrects for potential decoding errors associated with transporting a document at an asynchronous transport speed. An example of such an algorithm is the methodology described in application Ser. No. 08/504,643, which is assigned to the assignee of the present invention, and incorporated by reference herewith. Once the symbol is successfully decoded (i.e. a "good read" occurs) feedback is generated at step 310 indicating to the user that the symbol has been decoded. Such user feedback may take the form, for example, of a flashing LED element, or the sounding of an audible tone. Importantly, a control signal for starting motor 70 is generated at step 312 only after the symbol is successfully decoded. Otherwise, a document could be received by roller and transported through check reader without being decoded. After motor 70 is started at step 312 operation of the manual imaging check reader proceeds in steps 314 through 326 as in the case of check reader having a two speed transport mechanism, at steps 222, through 232, described previously in connection with FIG. 6b.

Figure 11:
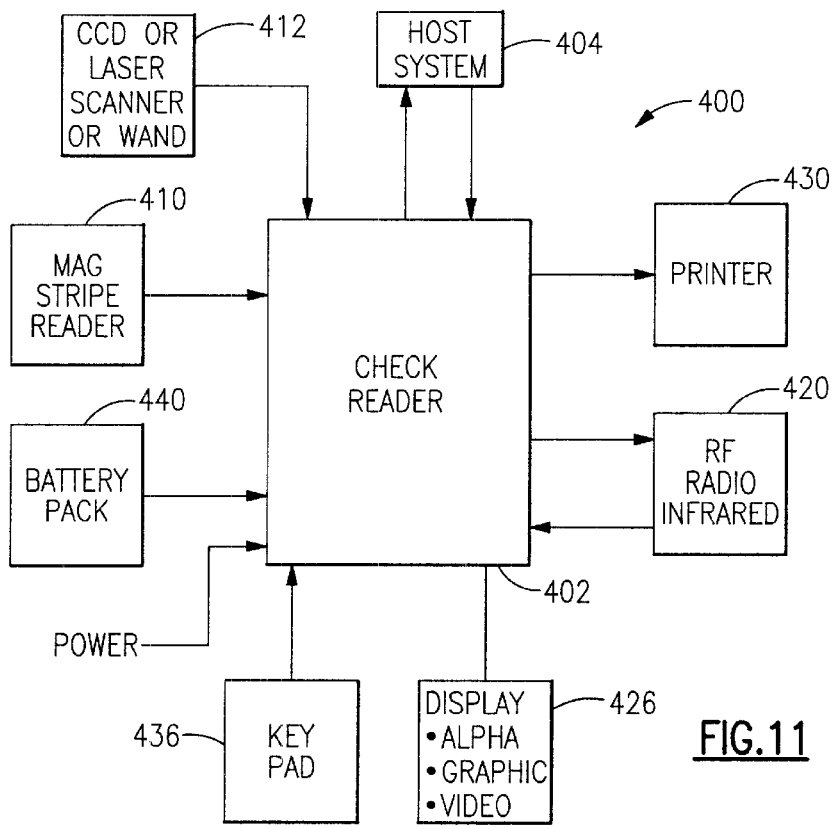
FIG. 11 is a block diagram of a check reading system having a check reader according to the invention as a component thereof.

The check reader thus far described can be implemented as a stand-alone device, or as a component in a check reading system 400. As is indicated in the block diagram of FIG. 11, a number of possible peripheral devices can be made to communicate with check reader 402 according to the invention.

For example, a host system 404 provided by at least one data format engine can be made to communicate with data format engine 64 of check reader 402. Host system 404 may download software and/or data to reader 402. For example, host system 404 may download decoding software to reader 402 or may download information regarding the endorser, payee, maker, etc. of a check. Check reader 402 can also be made to upload data to host system 404. In one common application, a captured electronic representation of a check is transported to host system 404 which comprises or is in communication with central check records management facility.

In addition to having an imaging assembly and a magnetic ink character reader mounted on the housing of a check reader, check reader 402 can be in communication with a peripheral magnetic stripe reader 410 and/or a peripheral imaging assembly 412. Peripheral imaging assembly 412 may be provided, for example, by a single element wand type imaging assembly, a multiple element type imaging assembly, a matrix array (camera) type imaging assembly, or a laser based imaging assembly.

Data from a peripheral magnetic stripe reader 410 or a peripheral imaging assembly 412 may communicate with check reader through a wireless communications port 420 which may be formed on reader 402. Data can be uploaded from a peripheral reader or imager or another peripheral component, via wireless communications port 420 using, for example, radio transmission or infrared communications technologies. Wireless transmission port 420 can also be used to upload data from check reader 402 to host system 404 or to download data from check reader 402 to a peripheral device.

Check reader 402 may have a display (not shown) formed thereon for displaying information regarding a processed check, or regarding the endorser, payee, maker, etc. of a check. The display may be provided, for example, by an alphanumeric LED or LCD display, a graphic display, or a video display.

Display of information regarding a check, an individual, or a banking institution may also be made by a peripheral display 425, which can be provided by an alphanumeric LED or LCD display, a graphic display, or a video display, commonly a computer monitor.

Check reader 402 may be in communication with a printer 430 which may be adapted to print, for example, a representation of an imaged check, MICR data printing, or a receipt for the previously made financial transaction. A keyboard 436 can be used to input data into check reader 402. For example, keyboard 436 may be used to input information about a check according to a verbal statement made by a presenter, which is cross referenced with information extracted from a check by processing of the electronically captured indicia of a check. Check reader 402 may be powered by a battery pack, as indicated by 440 of FIG. 11.

The present invention may be utilized in a variety of applications. Hardware and software adaptations of the present invention may vary depending upon application.

In one major application of the present invention, the check reader performs full check imaging for archiving purposes. A full check image can be uploaded to a records-management facility which may be provided by host system 404, thereby alleviating the need for further check imaging procedures. When an imaging assembly of the check reader performs full check imaging, the optics associated with the imaging assembly and the imaging assembly must be coordinated so that the imaging assembly images a complete width of a check. Methods of coordinating optics so that an imaging assembly images a subject of a desired width are well known, and therefore will not be discussed further herein.

In another application of a check reader according to the invention, the check reader is used in combination with specialized check indicia in an improved check reading system. In the improved check reading system, a two dimensional or preferably a stacked one dimensional portable data file (PDF) bar code symbol is printed on a check. The symbol is of a type that represents the image of the person authorized to present the check. When the check reader imaging assembly senses the PDF symbol, software associated with the symbol is activated to process the symbol and construct, for identification verification purposes, a near-photograph quality image of the person authorized to present the check. In this application, the optics and the imaging assembly need only image the specific area of a check having the symbol, and the check may be transported manually during image sensing, using a manual imaging check reader according to the invention as shown in FIG. 8. Display of the near-photograph image of the authorized presenter can be made by a display housed in the housing of the check reader, by a peripheral display 426, or by the output from printer 430.

In another application of the invention, an imaging assembly is positioned in the check reader housing to image the hand-written dollar amount written in the dollar amount box of the check. With appropriate character recognition software for processing the hand written numeral image, the imaging assembly can be made to automatically aid in the determining of the dollar amount of the check, thereby eliminating the initial stage check processing step of manually entering the dollar amount of a check into the computer system of a bank or store.

In a related application, an imaging assembly is provided which images the hand-written text image from the dollar amount line of the check. The imaging assembly imaging the dollar amount line of a check may be, for example, a full width imaging assembly having optics for imaging the full width of a check, a large imaging assembly which images both the dollar amount line and the dollar amount box, or a dedicated imaging assembly which images the dollar amount line only. Imaging of the dollar amount line can be used in place of or as a supplement to imaging the dollar amount box of a check so that the check processing step of entering the dollar amount of a check by hand will be eliminated.

In yet another application, an imaging assembly mounted in a check reader is utilized to image the signature line of a check. Where an imaging assembly is positioned to image the signature field, the captured image can be processed by signature processing software of the type which produces a numerical code that varies depending on highlight features of the signature. The numerical code generated by scanning and processing the signature image is then compared to a numerical signature code for the patron which has been printed on the check or which has been entered into the computer system of the bank or store.

While the present invention has been described with reference to a number of specific embodiments, it will be understood that the spirit and scope of the present invention should be determined with reference to the appended claims.

What is claimed is:

1. An apparatus for determining at least one of either a magnetically readable indicia and an optically imageable indicia on a document, said apparatus comprising:

a housing having a feed path;

transport means mounted in said housing for transporting documents partially along said feed path, said transport means being positioned in said housing so that a portion of said feed path extends forward of said transport means;

a magnetic ink character reader mounted to said housing proximate said feed path for generating a first type of electrical signal when an indicia printed with magnetic ink and said reader are moved relative to one another;

an imaging assembly mounted to said housing proximate said feed path for generating a second type of electrical signal when an indicia and said imaging assembly are moved relative one another, wherein said imaging assembly is mounted in relation to said transport means so that said imaging assembly is adapted to generate said second type of electrical signal when a document is manually moved relative to said imaging assembly while being loaded into said feed path before being transported by said transport means; and a control means in communication with said imaging assembly and with said magnetic ink character reader adapted to capture images corresponding to said second type of electrical signal.

2. The apparatus of claim 1, wherein said control means is further adapted to attempt to decode any decodable symbols which may be represented in said captured images.

3. The apparatus of claim 1, wherein said control means is further adapted to attempt to decode any decodable symbols which may be represented in said captured images, wherein said control means is further adapted to generate a good read signal upon successful decoding of a symbol, and wherein said control means is in communication with said transport means such that said transport means is not activated until receiving said good read signal from said control means.

4. The apparatus of claim 1, wherein said control means is further adapted to generate a good read signal upon successful decoding of a symbol, and wherein said control means is in communication with said transport means such that said transport means is not activated until receiving said good read signal from said control means such that said transport mean does not transport a document until said control means successfully decodes a symbol represented in a captured image corresponding to said electrical signals of said second type from said imaging assembly, said apparatus further comprising a position detector in communication with said communication means, wherein said control means is responsive to said position detector such that said control means does not begin to attempt to decode symbols until said position detector senses the presence of a document in said feed path.

5. A document processing apparatus comprising:

a housing having a feed path;

transport means mounted in said housing for transporting documents partially along said feed path, said transport means being positioned in said housing so that a portion of said feed path extends forward of said transport means;

an imaging assembly mounted to said housing proximate said feed path for generating an electrical signal when an indicia and said imaging assembly are moved relative one another, wherein said imaging assembly is mounted in relation to said transport means so that said imaging assembly is adapted to generate said electrical signal when a document is manually moved relative to said imaging assembly while being loaded into said feed path before being transported by said transport means; and control means in communication with said imaging assembly, said control means being adapted to capture images corresponding to said electrical signal.

6. The apparatus of claim 5, wherein said control means is further being adapted to attempt to decode any decodable symbols which may be represented in said captured images.

7. The apparatus of claim 5, wherein said control means is further adapted to attempt to decode any decodable symbols which may be represented in said captured images, wherein said control means is further adapted to generate a good read signal upon successful decoding of a symbol, and wherein said control means is in communication with said transport means such that said transport means is not activated until receiving said good read signal from said control means.

8. The apparatus of claim 5, wherein said control means is further adapted to attempt to decode any decodable symbols which may be represented in said captured images, wherein said control means is further adapted to generate a good read signal upon successful decoding of a symbol, and wherein said control means is in communication with said transport means such that said transport means is not activated until receiving said good read signal from said control means such that said transport mean does not transport a document until said control means successfully decodes a symbol represented in a captured image corresponding to said electrical signals from said imaging assembly, said apparatus further comprising a position detector in communication with said communication means, wherein said control means is responsive to said position detector such that said control means does not begin to attempt to decode symbols which may be represented in captured images corresponding to said electrical signals until said position detector senses the presence of a document in said feed path.

* * * * *